United States Patent
Nakagawa (10) Patent No.: US 8,733,920 B2
(45) Date of Patent: May 27, 2014

(54) INKJET RECORDING INK, INK CARTRIDGE, INKJET RECORDING DEVICE, INKJET RECORDING METHOD, AND INK RECORDED MATTER

(75) Inventor: Tomohiro Nakagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 13/357,160

(22) Filed: Jan. 24, 2012

(65) Prior Publication Data

US 2012/0188312 A1 Jul. 26, 2012

(30) Foreign Application Priority Data

Jan. 26, 2011 (JP) ................................ 2011-013687

(51) Int. Cl.
 *B41J 2/01* (2006.01)
 *B41J 2/21* (2006.01)
 *C09D 11/00* (2014.01)

(52) U.S. Cl.
 CPC *B41J 2/2107* (2013.01); *B41J 2/21* (2013.01); *C09D 11/326* (2013.01)
 USPC ............... 347/100; 347/95; 347/96; 106/31.6

(58) Field of Classification Search
 CPC .............. B41J 2/01; B41J 2/2107; B41J 2/21; B41J 2/17503; C09D 11/30; C09D 11/322; C09D 11/326
 USPC .......... 347/95–100; 523/160, 161; 106/31.13, 106/31.6
 See application file for complete search history.

(56) References Cited

U.S. PATENT DOCUMENTS

| | | | |
|---|---|---|---|
| 2003/0101905 A1* | 6/2003 | Momose | 106/31.58 |
| 2007/0197685 A1* | 8/2007 | Aruga et al. | 523/160 |
| 2008/0092773 A1* | 4/2008 | Matsuyama | 106/31.65 |
| 2009/0114121 A1* | 5/2009 | Morohoshi et al. | 106/31.86 |
| 2011/0205288 A1 | 8/2011 | Matsuyama et al. | |
| 2011/0318551 A1 | 12/2011 | Nakagawa | |
| 2012/0098883 A1* | 4/2012 | Matsuyama et al. | 347/21 |

FOREIGN PATENT DOCUMENTS

| | | |
|---|---|---|
| JP | 2001-81372 | 3/2001 |
| JP | 2003-327880 | 11/2003 |
| JP | 2009-149758 | 7/2009 |
| JP | 2009-149815 | 7/2009 |
| WO | WO 2010150913 A1 * | 12/2010 |

\* cited by examiner

*Primary Examiner* — Matthew Luu
*Assistant Examiner* — Rut Patel
(74) *Attorney, Agent, or Firm* — Oblon, Spivak, McClelland, Maier & Neustadt, L.L.P.

(57) ABSTRACT

To provide an inkjet recording ink, which contains water, a water-soluble organic solvent, a colorant, and a surfactant, wherein the colorant contains a surfactant-dispersible pigment (A) dispersed by the surfactant, and a resin-coated pigment (B), and wherein the surfactant is a surfactant selected from the group consisting of anionic surfactants represented by the following formula (1), and having HLB value of 12 or higher:

$$R_1-O-(CH_2CH_2O)_m-A \qquad (1)$$

where $R_1$ is a C2-C24 alkyl group, alkenyl group, alkylphenyl group, or alkylallyl group; A is $-COOM1$, $-SO_3M2$, or $-PO(OM3)OM4$, where M1, M2 and M4 are each independently alkali metal, quaternary ammonium, quaternary phosphonium, or alkanolamine, and M3 is a hydrogen atom or $R_2(CH_2CH_2O)n$ with proviso that $R_2$ is a C1-C4 alkyl group, alkenyl group, alkylphenyl group, or alkylallyl group, and n is an integer of 4 to 20; and m is and integer of 15 to 40.

17 Claims, 2 Drawing Sheets

INKJET RECORDING INK, INK CARTRIDGE, INKJET RECORDING DEVICE, INKJET RECORDING METHOD, AND INK RECORDED MATTER

BACKGROUND OF THE INVENTION

1. Field of the Invention

The present invention relates to an inkjet recording ink, and to an ink cartridge, inkjet recording device, inkjet recording method, and ink recorded matter using the inkjet recording ink.

2. Description of the Background

An inkjet recording system has advantages that it is easy to produce full-color images as a process is simple compared to other recording systems, and gives images of high resolution with a device of a simple structure. As for an ink used for the inkjet recording system, a dye-based ink in which various water-soluble dyes are dissolved in water, or a mixed liquid of water and an organic solvent, has been used. The dye-based ink has however a disadvantage that it has poor light fastness though having excellent vividness of color tone. Therefore, an ink used a pigment that excels in water resistance and weather resistance over the dye has been used.

As a method for dispersing a pigment in an aqueous medium, there has been known a method for using a dispersant such as a surfactant and a water-soluble resin, a method for surface treating a pigment so that a carboxyl group, hydroxyl group, sulfone group, phosphoric acid group, quaternary ammonium or salts thereof is bonded to the surface of the pigment, and a method for coating the pigment with a resin bonded with an ionic group.

Japanese Patent Application Laid-Open (JP-A) No. 2001-81372 discloses an inkjet recording ink in which a pigment is dispersed by polyoxyethylene ether sulfate, as hence having excellent long term storage stability, having vivid color saturation. JP-A No. 2003-327880 discloses, moreover, an ink in which colorant particles prepared by coating inorganic pigment particles with an organic pigment or carbon black are dispersed by an anionic surfactant for the purpose of attaining an ink having excellent ejection stability and storage stability, and hence the ink having excellent ejection stability and the color tone close to that of dye inks.

However, use of a surfactant in a large amount for improving dispersion stability leads to problems such as generation of bubbles, and deterioration in image quality. Therefore, it is difficult to stably disperse a pigment over long period of time. Since inkjet printers have been currently used in various purposes, not only long term storage stability and color tone, but also improvements in fastness and image density of prints are desired.

JP-A No. 2009-149758 discloses a self-dispersible pigment ink containing water-insoluble polymer particles. This ink can form images of high fastness as the pigment is coated with a resin, but the particle diameters are large as coated by the resin. Therefore, the ink has a problem that it has poor ejection stability.

As described above, the pigment dispersed by the surfactant gives prints of poor fastness, and requires the surfactant to attain a stable dispersion state, and in same cases, causes generation of bubbles, and deterioration in image quality. On the other hand, the resin-coated pigment does not require a dispersant, and has excellent abrasion resistance and marker resistance, but cannot easily achieve both desirable image density and ejection stability. Therefore, it is difficult to attain an ink capable of producing prints of high image fastness, while maintaining storage stability and ejection stability.

Considering these situations, it is one of the ideas that a combination of the resin-coated pigment and the surfactant-dispersible pigment is used in an ink. In the case where pigments each dispersed in a different manner are mixed, however, there is a problem that one pigment influences another pigment to cause aggregations, impairing dispersion stability.

JP-A No. 2009-149815 discloses that pigments each dispersed in a different manner, i.e., a surfactant-dispersible pigment and a self-dispersible pigment, are dispersed by a naphthalene-sodium sulfonate condensate, but image fastness of prints formed with this ink is not sufficient, and application of this ink is restricted to a black ink, cannot be applied for color inks.

SUMMARY OF THE INVENTION

The present invention aims to provide an ink that improves dispersibility of the ink containing a surfactant-dispersible pigment (A) and a resin-coated pigment (B), has excellent ejection stability and storage stability, and that can produce prints of high image density, suppressed bleeding, and abrasion resistance and marker resistance.

As a result of the diligent studies conducted by the present inventors to achieve the aforementioned problems, the present inventors have found that a certain anionic surfactant having an oxyethylene chain and having the HLB value of 12 or higher can stably disperse an ink containing a surfactant-dispersible pigment (A) and a resin-coated pigment (B), thereby providing an ink capable of forming color images of high fastness while maintaining storage stability and ejection stability. In addition, they have found that counter cations are present in the ink because of the anionic surfactant, so that the cation component and the resin-coated pigment react each other and immediately cause aggregations as moisture in the ink is evaporated on paper, thereby giving high image density, preventing mixing of colors at an interface between different colors (bleeding) owing to the quick aggregations, and solving the aforementioned problem.

Accordingly, the inkjet recording ink of the present invention contains water, a water-soluble organic solvent, a colorant, and a surfactant, wherein the colorant contains a surfactant-dispersible pigment (A) which is dispersed by the surfactant, and a resin-coated pigment (B), and wherein the surfactant is a surfactant having an HLB value of 12 or higher, selected from the group consisting of anionic surfactants represented by the following formula (1);

$$R_1-O-(CH_2CH_2O)_m-A \qquad (1)$$

where R1 is a C2-C24 alkyl group, alkenyl group, alkylphenyl group, or alkylallyl group; A is $-COOM1$, $-SO_3M2$, or $-PO(OM3)OM4$, where M1, M2 and M4 are each independently alkali metal, quaternary ammonium, quaternary phosphonium, or alkanolamine, and M3 is a hydrogen atom or $R_2(CH_2CH_2O)n$ with proviso that $R_2$ is a C1-C4 alkyl group, alkenyl group, alkylphenyl group, or alkylallyl group, and n is an integer of 4 to 20; and m is and integer of 15 to 40.

As can be understood from the specific and concrete descriptions below, the present invention provides an ink having excellent ejection stability, and storage stability, and capable of forming color images of high image density, suppressed bleeding, and high fastness.

DETAILED DESCRIPTION OF THE INVENTION

Inkjet Recording Ink and Ink Recorded Matter

The inkjet recording ink (may be simply referred to as "ink" hereinafter) of the present invention contains at least water, a water-soluble organic solvent, a colorant, and a surfactant, where the colorant contains a surfactant-dispersible pigment (A) dispersed by the surfactant and a resin-coated pigment (B), and the surfactant is a surfactant selected from anionic surfactants represented by the following formula (1) and having HLB value of 12 or higher. In addition, the inkjet ink of the present invention may contain other components such as a resin emulsion (dispersion stabilizer), a penetrating agent, a defoaming agent, a pH regulator, a preservative-antifungal agent, a rust inhibitor, and antioxidant, if necessary.

$$R_1\text{—}O\text{—}(CH_2CH_2O)_m\text{-}A \quad (1)$$

In the formula (1), R1 is a C2-C24 alkyl group, alkenyl group, alkylphenyl group, or alkylallyl group; A is —COOM1, —SO$_3$M2, or —PO(OM3)OM4; and m is an integer of 5 to 40. Moreover, M1, M2, and M4 contained in A are each independently alkali metal, quaternary ammonium, quaternary phosphonium, or alkanolamine, and M3 is a hydrogen atom or $R_2(CH_2CH_2O)n$. $R_2$ contained in M3 is a C1-C4 alkyl group, alkenyl group, alkylphenyl group, or alkylallyl group, and n is an integer of 4 to 20.

<Surfactant-Dispersible Pigment (A)>

The surfactant-dispersible pigment (A) is appropriately selected depending on the intended purpose without any restriction, provided that it can be dispersed in an aqueous medium by the surfactant explained later. For example, the surfactant-dispersible pigment (A) may be an inorganic pigment, or an organic pigment, and may be used independently, or in combination.

Examples of the inorganic pigment include titanium oxide, iron oxide, calcium carbonate, barium sulfate, aluminum hydroxide, barium yellow, Prussian blue, cadmium red, chrome yellow, metal powder, and carbon black. Among them, the carbon black is preferable. Examples of the carbon black include those produced by conventional methods, such as a contact method, a furnace method, and a thermal method.

Examples of the organic pigment include an azo pigment, an azomethine pigment, a polycyclic pigment, a dye chelate, a nitro pigment, a nitroso pigment, and aniline black. Among them, the azo pigment and the polycyclic pigment are preferable.

Examples of the azo pigment include azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridon pigment, a dioxazine pigment, an indigo pigment, a thioindigo pigment, an iso-indolinone pigment, a quinophtharone pigment, and a rhodamine B lake pigment. Examples of the dye chelate include a basic dye chelate, and an acidic dye chelate.

Moreover, examples of the surfactant-dispersible pigment (A) used for black include: carbon black (C.I. Pigment Black 7) such as furnace black, lamp black, acetylene black, and channel black; metals such as copper, iron (C.I. Pigment Black 11), and titanium oxide; and an organic pigment such as aniline black (C.I. Pigment Black 1).

The carbon black is preferably carbon black produced by a furnace method or a channel method, and having a primary particle diameter of 15 nm to 40 nm, BET specific surface area of 50 m$^2$/g to 300 m$^2$/g, DBP oil absorption of 40 ml/100 g to 150 ml/100 g, volatiles content of 0.5% by mass to 10% by mass, and pH of 2 to 9.

In the present specification, the "volatiles content" of the carbon black means the value measured by the following method.

Specifically, a dry sample of carbon black is loaded by tapping in a porcelain crucible attached with a platinum crucible or a partial lid of the same shape and volume to the platinum crucible, up to the height not exceeding 2 mm from the bottom of the lid, and a mass (WD) thereof is measured. Subsequently, the crucible is covered with the lid, and placed in an electric furnace to thereby heat at 950° C.±25° C. accurately for 7 minutes. Thereafter, the crucible is taken out from the furnace, and left to stand to cool down to the room temperature in a desiccator. Then, the mass (WR) thereof after heating is measured. The value (V) obtained by placing these values of the mass in the following formula.

$$V = \frac{W_D - W_R}{W_D} \times 100$$

In the formula above, V denotes the volatiles content (%), WD denotes a mass (g) of the dry sample, and WR denotes a mass (g) of the sample after heating.

As for the carbon black, commercial products can be used. Examples of the commercial products include: No. 2300, No. 900, MCF-88, No. 33, No. 40, No. 45, No. 52, MA7, MA8, MA100, No. 2200B (all manufactured by MITSUBISHI CHEMICAL CORPORATION); Raven 700, Raven 5750, Raven 5250, Raven 5000, Raven 3500, Raven 1255 (all manufactured by Columbian Chemicals Company); Regal 400R, Regal 330R, Regal 660R, Mogul L, Monarch 700, Monarch 800, Monarch 880, Monarch 900, Monarch 1000, Monarch 1100, Monarch 1300, Monarch 1400 (all manufactured by CABOT CORPORATION); Color Black FW1, Color Black FW2, Color Black FW2V, Color Black FW18, Color Black FW200, Color Black S150, Color Black S160, Color Black S170, PRINTEX 35, PRINTEX U, PRINTEX V, PRINTEX 140U, PRINTEX 140V, SPECIAL BLACK 6, SPECIAL BLACK 5, SPECIAL BLACK 4A, SPECIAL BLACK 4, and NIPEX150-IQ (all manufactured by DEGUSSA Co.).

The surfactant-dispersible pigment (A) for color, i.e., the pigment used for a yellow ink, is appropriately selected depending on the intended purpose without any restriction, and examples thereof include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

The pigment used for a magenta ink is appropriately selected depending on the intended purpose without any restriction, and examples thereof include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

The pigment used for a cyan ink is appropriately selected depending on the intended purpose without any restriction, and examples thereof include: C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66; and C.I. Vat Blue 4, and C.I. Vat Blue 60.

Moreover, the surfactant-dispersible pigment (A) contained in each ink for use in the present invention can be newly produced specifically for the present invention.

Note that, by combining Pigment Yellow 74 as the yellow pigment, Pigment Red 122 and Pigment Violet 19 as the magenta pigment, and Pigment Blue 15:3 as the cyan pigment, inks each having excellent color tone and light fastness, and desirable balance in the properties. Therefore, use of a combination of the pigments is preferable.

The surfactant-dispersible pigment (A) is dispersed in the aqueous medium, used as a dispersion solution of the surfactant-dispersible pigment (A). The dispersion solution can be obtained by dispersing the surfactant-dispersible pigment (A), the surfactant described later, water, and various additives added if necessary, by means of a disperser, e.g., a bead mill, such as DYNOMILL KDL-Type (manufactured by K.K. SHINMARU ENTERPRISES CORPORATION), AGITATOR MILL LMZ (manufactured by ASHIZAWA FINETECH LTD.) or SC MILL (manufactured by MITSUI MINING K.K.), followed by dispersing by means of a bead-less mill, such as high-speed shear force CLEAR SS5 (manufactured by M TECHNIQUE CO., LTD), CABITRON CD1010 (manufactured by EURO TECH, LTD), MODULE DR2000 (manufactured by K.K. SHINMARU ENTERPRISES CORPORATION), thin-film rotation-type T. K. FILMIX (manufactured by TOKUSHUKIKAKOUGYOU K.K.), super-high pressure shock-type ALTEMIZER (manufactured by SUGINO MACHINE LTD.) or NANOMIZER (manufactured by YOSHIDA KIKAI CO., LTD).

The beads used in the bead mill are generally preferably ceramic beads, and commonly, zirconium beads are used. The diameters of beads are appropriately selected depending on the intended purpose without any restriction, but they are preferably 0.05 mm or smaller, more preferably 0.03 mm or smaller.

By pre-treating coarse particles with a homogenizer or the like at the stage prior to the treatment by the disperser, it is possible to sharpen the particle distribution even more, which leads to improvements in image density and ejection stability.

<Resin-Coated Pigment (B)>

The resin-coated pigment (B) for use in the present invention is particles in each of which a pigment is included in a resin, i.e. pigment-containing resin particles (may be also referred to as "pigment-containing resin particles" hereinafter). The resin is preferably a water-insoluble resin.

The pigment contained in the resin-coated pigment (B) is appropriately selected depending on the intended purpose without any restriction, and the same pigment to that of the surfactant-dispersible pigment can be used.

The coating resin in the resin-coated pigment (B) is appropriately selected depending on the intended purpose without any restriction, and examples thereof include a vinyl-based polymer, a polyester-based polymer, and a polyurethane-based polymer. Among them, a vinyl-based polymer (may be simply referred to as "vinyl polymer" hereinafter) obtained by addition polymerization of vinyl monomers (e.g. a vinyl compound, vinylidene compound, and vinylene compound) is preferably used for attaining dispersion stability of an aqueous ink.

As for the vinyl polymer, preferably polymers include a polymer prepared by copolymerizing a monomer mixture containing (a) a salt generating group-containing monomer (may also referred to as "(a) component"), (b) a macromer (may also referred to as "(b) component") and/or (c) hydrophobic monomer (may also be referred to as "(c) component"). This polymer has a constitutional unit derived from (a) component, a constitutional unit derived from (b) component, and/or a constitutional unit derived from (c) component. The more preferable vinyl polymer is a graft polymer containing the constitutional unit derived from (a) component, or a combination of the constitutional unit derived from (a) component and the constitutional unit derived from (c) component in a principle chain thereof, and the constitutional unit derived from (b) component in side chains thereof.

<<(a) Salt Generating Group-Containing Monomer>>

The (a) salt generating group-containing monomer is used for enhancing the dispersion stability of the obtainable aqueous dispersion solution.

Examples of the salt generating group include a carboxyl group, a sulfonic acid group, a phosphoric acid group, an amino group, and an ammonium group. Among them, the carboxyl group is particularly preferable.

Examples of the salt generating group-containing monomer include a cationic monomer, and an anionic monomer. The cationic monomer includes an unsaturated tertiary amine-containing monomer, and an unsaturated ammonium salt-containing monomer. Specific examples of the cationic monomer include: monovinyl pyridines such as vinyl pyridine, 2-methyl-5-vinyl pyridine, and 2-ethyl-5-vinyl pyridine; dialkyl amino group-containing styrenes such as N,N-dimethyl amino styrene, N,N-dimethyl amino methylstyrene; dialkyl amino acrylate(meth)acrylate group-containing esters such as N,N-dimethyl amino ethyl acrylate, N,N-dimethyl amino ethyl methacrylate, N,N-diethyl amino ethyl acrylate, N,N-diethyl amino ethyl methacrylate, N,N-dimethyl amino propyl acrylate, N,N-dimethyl amino propyl methacrylate, N,N-diethyl amino propyl acrylate, N,N-diethyl amino propyl methacrylate; dialkyl amino group-containing vinyl ethers such as 2-dimethyl amino ethylvinyl ether; dialkyl amino group-containing (meth)acryl amides such as N—(N',N'-dimethyl amino ethyl)acryl amide, N—(N',N'-dimethyl amino ethyl)methacryl amide, N—(N', N'-diethyl amino ethyl)acryl amide, N—(N',N'-diethyl amino ethyl)methacryl amide, N—(N',N'-dimethyl amino propyl) acryl amide, N—(N',N'-dimethyl amino propyl)methacryl amide, N—(N',N'-diethyl amino propyl)acryl amide, N—(N', N'-diethyl amino propyl)methacryl amide; quaternized foregoing monomers with a conventional quaternizing agent such as alkyl halide (C1-C18 alkyl group, halogen being selected from chlorine, bromine, and iodine), benzylhalide (e.g., benzyl chloride and benzyl bromide), alkyl ester (C1-C18 alkyl group) of alkyl or aryl sulfonic acid (e.g. methanesulfonic acid, benzenesulfonic acid and toluene sulfonic acid), and dialkyl(C1-C4 alkyl group) sulfate; and vinyl pyrrolidone. Among them, N,N-dimethyl amino ethyl(meth)acrylate, N—(N',N'-dimethyl amino propyl)(meth)acryl amide, and vinyl pyrrolidone are preferable.

Moreover, the anionic monomer includes an unsaturated carboxylic acid monomer, an unsaturated sulfonic acid monomer, and an unsaturated phosphoric acid monomer. Specifically, examples of the unsaturated carboxylic acid include acrylic acid, methacrylic acid, crotonic acid, itaconic acid, maleic acid, fumaric acid, citraconic acid, 2-methacryloyloxymethyl succinate, anhydrides thereof and salts thereof. Examples of the unsaturated sulfonic acid monomer include: styrene sulfonic acid, 2-acrylamide-2-methylpropane sulfonic acid, 3-sulfopropyl(meth)acrylic acid ester, bis-(3-sulfopropyl)-itaconic acid ester, and salts thereof; and others including sulfuric acid monoester of 2-hydroxyethyl (meth)acrylic acid and a salt thereof. Examples of the unsaturated phosphoric acid monomer include vinylphosphonic acid, vinyl phosphate, his (methacryloxyethyl)phosphate, diphenyl-2-acryloyloxyethyl phosphate, diphenyl-2-methacryloyloxyethyl phosphate, dibutyl-2-acryloyloxyethyl phosphate, dibutyl-2-methacryloyloxyethyl phosphate, and dioctyl-2-(meth)acryloyloxyethyl phosphate. In view of the dispersion stability, ejection stability, the unsaturated carboxylic acid monomer is preferable, and acrylic acid and methacrylic acid are more preferable.

<<(b) Macromer>>

A (b) macromer is used for enhancing dispersion stability of polymer particles, especially when the polymer particles contain a colorant. In the present specification, the term "macromer (may be also referred to as macro monomer)" means a polymer whose terminals are modified with functional groups, by introducing polymerizable functional groups to terminals of the polymer chain. Examples of the (b) macromer include macromers that are monomers each including a polymerizable unsaturated group, and having a number average molecular weight of 500 to 100,000, preferably 1,000 to 10,000. Note that, the number average molecular weight of the (b) macromer is measured by gel chromatography using chloroform containing 1 mmol/L dodecyldimethyl amine as a solvent, and polystyrene as a reference material.

Among the aforementioned (b) macromers, a styrene-based macromer, and aromatic group-containing (meth)acrylate macromer each containing a polymerizable functional group at one terminal thereof are preferable for attaining dispersion stability of the colorant-containing polymer particles.

Examples of the styrene-based macromer include a homopolymer of styrene-based monomers, and a copolymer of a styrene-based monomer and another monomer. Examples of the styrene-based monomer include styrene, 2-methylstyrene, vinyl toluene, ethylvinyl benzene, vinyl naphthalene, and chlorostyrene.

Examples of the aromatic group-containing (meth)acrylate-based macromer include a homopolymer of aromatic group-containing (meth) acrylate, and a copolymer of an aromatic group-containing (meth)acrylate and another monomer. The aromatic group-containing (meth)acrylate is (meth)acrylate having a C7-C22, preferably C7-C18, more preferably C7-C12 aryl alkyl group that may contain a substitute including a hetero atom, or (meth)acrylate having a C6-C22, preferably C6-C18, more preferably C6-C12 aryl group that may contain a substitute including a hetero atom. Examples of the substituent including the hetero atom include a halogen atom, an ester group, an ether group, and a hydroxy group. Specific examples thereof include benzyl(meth)acrylate, phenoxyethyl(meth)acrylate, 2-hydroxy-3-phenoxypropyl acrylate, and 2-methacryloyloxyethyl-2-hydroxypropyl phthalate. Among them, benzyl(meth)acrylate is particularly preferable.

Moreover, as the polymerizable functional group present at one terminal of the aforementioned macromer, an acryloyloxy group and a methacryloyl oxy group are preferable. As for another monomer to be copolymerized, acrylonitrile is preferable.

An amount of the styrene-based monomer in the styrene-based macromer, or an amount of the aromatic group-containing (meth)acrylate in the aromatic group-containing (meth)acrylate-based macromer is preferably 50% by mass or larger, more preferably 70% by mass or larger for increasing affinity of the resin-coated pigment (B).

The (b) macromer may contain a side chain formed of other constitutional unit such as organopolysiloxane. This side chain can be obtained, for example, by copolymerizing a silicone-based macromer having a polymerizable functional group at one terminal thereof, which is represented by the following formula (2).

$$CH_2=C(CH_3)-COOC_3H_6-(Si(CH_3)_2O)_t-Si(CH_3)_3 \qquad (2)$$

In the formula (2), t denotes an integer of 8 to 40.

Examples of the commercially available the styrene-based monomer as the (b) component include the product names AS-6(S), AN-6(S), and HS-6(S), of TOAGOSEI CO., LTD.

<<(c) Hydrophobic Monomer>>

The (c) hydrophobic monomer is used for improving printing density. Examples of the hydrophobic monomer include alkyl(meth)acrylate, and an aromatic group-containing monomer.

As for the alkyl(meth)acrylate, those having C1-C22 alkyl group, preferably C6-C18 alkyl group, are preferable. Examples of the alkyl(meth)acrylate include methyl(meth)acrylate, ethyl(meth)acrylate, (iso)propyl(meth)acrylate, (iso or tert)butyl(meth)acrylate, (iso)amyl (meth)acrylate, cyclohexyl(meth)acrylate, 2-ethylhexyl(meth)acrylate, (iso)octyl (meth)acrylate, (iso)decyl(meth)acrylate, (iso)dodecyl (meth)acrylate, and (iso)stearyl(meth)acrylate.

Note that, in the present specification, "(iso or tertiary)" and "(iso)" denote both the case where these groups are present and the case where these groups are not present. In the case where these groups are not present, "(iso or tertiary)" and "(iso)" denotes normal. Moreover, "(meth)acrylate" denotes acrylate, or methacrylate, or both acrylate and methacrylate.

The aromatic group-containing monomer is preferably a vinyl monomer having a C6-C22, preferably C6-C18, more preferably C6-C12 aromatic group that may contain a substituent containing a hetero atom. Examples of the aromatic group-containing monomer include the aforementioned styrene-based monomer (c-1 component), and the aforementioned aromatic group-containing (meth)acrylate (c-2 component). Examples of the substituent containing a hetero atom include those listed earlier. It is also preferred that the (c-1) component and the (c-2) component be used in combination.

It is preferred that the (c) component contain the styrene-based monomer (c-1 component) for improving printing density. As for the styrene-based monomer (c-1 component), styrene and 2-methyl styrene are particularly preferable.

An amount of the (c-1) component in the (c) component is preferably 10% by mass to 100% by mass, more preferably 20% by mass to 80% by mass, for improving printing density.

Moreover, as for the aromatic group-containing (meth) acrylate (c-2) component, benzyl(meth)acrylate, and phenoxyethyl(meth)acrylate are preferable.

An amount of the (c-2) component in the (c) component is preferably 10% by mass to 100% by mass, more preferably 20% by mass to 80% by mass for improving printing density and glossiness.

<<(d) Hydroxy Group-Containing Monomer>>

The monomer mixture may further contain a (d) hydroxy group-containing monomer (may also be referred to as "(d) component" hereinafter). The (d) hydroxy group-containing monomer is used for further enhancing dispersion stability.

Examples of the (d) component include 2-hydroxyethyl (meth) acrylate, 3-hydroxypropyl(meth)acrylate, polyethylene glycol (n=2 to 30, n denotes an average molar numbers of the added oxyalkylene groups, n indicate the same hereinafter)(meth)acrylate, polypropylene glycol (n=2 to 30)(meth) acrylate, and poly(ethylene glycol (n=1 to 15)-propylene glycol (n=1 to 15))(meth)acrylate. Among them, 2-hydroxyethyl (meth) acrylate, polyethylene glycol mono methacrylate, and polypropylene glycol methacrylate are preferable.

The monomer mixture may further contain the (e) monomer represented by the following formula (3) (may also be referred to as "(e) component" hereinafter).

$$CH_2=C(R^1)COO(R^2O)_qR^3 \quad (3)$$

In the formula (3), $R^1$ is a hydrogen atom or a C1-C5 lower alkyl group; $R^2$ is a C1-C30 divalent hydrocarbon group that may contain a hetero atom; $R^3$ is a C1-C30 monovalent hydrocarbon group that may contain a hetero atom; and q denotes an average number of moles added, and is 1 to 60, preferably 1 to 30.

The (e) component is used for improving the ejecting properties of the ink.

In the formula (3), examples of the hetero atom include a nitrogen atom, an oxygen atom, a halogen atom, and a sulfur atom.

Suitable examples of R1 include a methyl group, an ethyl group, and an (iso)propyl group.

Suitable examples of the $R^2O$ group include an oxyethylene group, an oxytrimethylene group, an oxypropane-1,2-diyl group, an oxytetramethylene group, oxyheptamethylene group, oxyhexamethylene group, and C2-C7 oxyalkanediyl group (oxyalkylene group) formed of a combination of the foregoing groups.

Suitable examples of the R3 include a C1-C30, preferably C1-C20 aliphatic alkyl group, an aromatic ring-containing C7-C 30 alkyl group, and a heterocycle-containing C4-C30 alkyl group.

Specific examples of the (e) component include methoxypolyethylene glycol (1 to 30, the number indicates the value of q of the formula (3), the number also indicating the same hereinafter) (meth)acrylate, methoxypolytetramethylene glycol (1 to 30) (meth)acrylate, ethoxypolyethylene glycol (1 to 30) (meth)acrylate, octoxypolyethylene glycol (1 to 30) (meth)acrylate, polyethylene glycol (1 to 30) (meth)acrylate 2-ethylhexyl ether, (iso)propoxypolyethylene glycol (1 to 30) (meth)acrylate, butoxypolyethylene glycol (1 to 30) (meth) acrylate, methoxypolypropylene glycol (1 to 30) (meth)acrylate, and methoxy(ethylene glycol-propylene glycol copolymer) (1 to 30, in which ethylene glycol being 1 to 29) (meth) acrylate. Among them, octoxypolyethylene glycol (1 to 30) (meth)acrylate, and polyethylene glycol (1 to 30) (meth)acrylate 2-ethylhexyl ether are preferable.

Specific examples of the commercially available (d) component and (e) component include: polyfunctional acrylate monomer, NKester M-40G, M-90G, and M-230G of Shin-Nakamura Chemical Co., Ltd.; and BLEMMER® PE-90, PE-200, PE-350, PME-100, PME-200, PME-400, PME-1000, PP-500, PP-800, PP-1000, AP-150, AP-400, AP-550, AP-800, 50PEP-300, 50POEP-800B, AND 43PAPE600B of NOF CORPORATION.

The aforementioned (a) to (e) components may be each used independently, or in combination.

In the course of the production of the vinyl polymer, an amount of the (a) to (e) components in the monomer mixture (the amount indicates an amount of non-neutralized components, the amount indicates the same hereinafter) or an amount of the constitutional units derived from the (a) to (e) components is as follows.

An amount of the (a) component is preferably 2% by mass to 40% by mass, more preferably 2% by mass to 30% by mass, and even more preferably 3% by mass to 20% by mass in view of dispersion stability of the resulting dispersion solution.

An amount of the (b) component is preferably 1% by mass to 25% by mass, more preferably 5% by mass to 20% by mass especially for enhancing the interaction with the colorant, and improving dispersion stability.

An amount of the (c) component is preferably 5% by mass to 98% by mass, more preferably 10% by mass to 60% by mass for improving printing density.

An amount of the (d) component is preferably 5% by mass to 40% by mass, more preferably 7% by mass to 20% by mass in view of the dispersion stability of the resulting dispersion solution.

An amount of the (e) component is preferably 5% by mass to 50% by mass, more preferably 10% by mass to 40% by mass for improving ejecting properties of the ink.

A total amount of the (a) component and the (d) component in the monomer mixture is preferably 6% by mass to 60% by mass, more preferably 10% by mass to 50% by mass in view of the dispersion stability of the resulting dispersion solution. A total amount of the (a) component and the (e) component is preferably 6% by mass to 75% by mass, more preferably 13% by mass to 50% by mass in view of the dispersion stability and ejecting properties. Moreover, a total amount of the (a) component, the (d) component, and the (e) component is preferably 6% by mass to 60% by mass, more preferably 7% by mass to 50% by mass in view of the dispersion stability of the resulting dispersion stability and the obtainable printing density.

Furthermore, a mass ratio ((a) component/[(b) component+(c) component]) of the (a) component to a combination of the (b) component and the (c) component is preferably 0.01 to 1, more preferably 0.02 to 0.67, and even more preferably 0.03 to 0.50 in view of the dispersion stability of the resulting dispersion solution and the obtainable printing density.

—Production Method of Polymer—

The polymer can be produced by copolymerizing the monomer mixture in accordance with a conventional polymerization method, such as block polymerization, solution polymerization, suspension polymerization, and emulsion polymerization. Among these polymerization methods, the solution polymerization is preferable.

A solvent used in the solution polymerization is not particularly restricted, but it is preferably a polar organic solvent. In the case where the polar organic solvent is water-miscible, the polar organic solvent can be used by mixing with water. Examples of the polar organic solvent include: C1-C3 aliphatic alcohol such as methanol, ethanol, and propanol; ketones such as acetone, methyl ethyl ketone (MEK), and methyl isobutyl ketone (MIBK); and esters such as ethyl acetate. Among them, methanol, ethanol, acetone, MEK, MIBK and a mixed solvent of one of the preceding solvent and water are preferable.

For the polymerization, a conventional radical polymerization initiator can be used, and examples of the radical polymerization initiator include: azo compounds such as 2,2'-azobisisobutyronitrile, and 2,2'-azobis(2,4-dimethylvaleronitrile); and organic peroxides such as t-butylperoxy octoate, and dibenzoyl oxide. An amount of the radical polymerization initiator is preferably 0.001 mol to 5 mol per mole of the monomer mixture, more preferably 0.01 mol to 2 mol per mole of the monomer mixture.

For the polymerization, a conventional polymerization chain transfer agent may be further added, and examples thereof include: mercaptan such as octyl mercaptan, and 2-mercapto ethanol; and thiuram disulfide.

The polymerization conditions of the monomer mixture cannot be determined unconditionally, because the conditions vary depending on the radical polymerization initiator, monomer, and solvent for use. Typically, the polymerization temperature is preferably 30° C. to 100° C., more preferably 50° C. to 80° C., and the polymerization duration is preferably 1 hour to 20 hours. Moreover, the polymerization atmosphere is preferably an inert gas atmosphere such as nitrogen gas atmosphere, and an argon gas atmosphere.

After the completion of the polymerization reaction, the generated polymer can be separated from the reaction solution by a conventional method such as reprecipitation, and removal of the solvent. Moreover, the obtained polymer can be purified by removing non-reacted monomers by repeating reprecipitation, or by membrane separation, chromatography, or extraction.

The weight average molecular weight of the polymer for use in the present invention is preferably 5,000 to 500,000, more preferably 10,000 to 400,000, even more preferably 10,000 to 300,000, and particularly preferably 20,000 to 300,000, in view of the obtainable printing density and glossiness, and the dispersion stability of the colorant. Note that, the measuring method of the weight average molecular weight of the polymer is as described below.

The measurement is carried out by gel chromatography [GPC system (HLC-8120GPC) manufactured by TOSOH CORPORATION, column (TSK-GEL, α-M×2) manufactured by TOSOH CORPORATION, flow rate: 1 mL/min] using N,N-dimethylformamide containing 60 mmol/L of phosphoric acid and 50 mmol/L of lithium bromide as a solvent for measuring the weight average molecular weight of the polymer, and using polystyrene as a reference material.

In the case where the polymer for use in the present invention contains a salt-generating group derived from the (a) salt generating group-containing monomer, the polymer is used after neutralizing with a neutralizer. As for the neutralizer, an acid group or a base group can be used depending on a type of the salt-generating group contained in the polymer. Examples of the acid include hydrochloric acid, acetic acid, propionic acid, phosphoric acid, sulfuric acid, lactic acid, succinic acid, glycolic acid, gluconic acid, and glyceric acid, and examples of the base include lithium hydroxide, sodium hydroxide, potassium hydroxide, ammonia, methyl amine, dimethyl amine, trimethyl amine, ethyl amine, diethyl amine, triethyl amine, triethanol amine, and tributyl amine.

The neutralization degree of the salt-generating group is preferably 10% to 200%, more preferably 20% to 150%, and even more preferably 50% to 150%.

The neutralization degree can be, in the case where the salt-generating group is an anionic group, determined by the following formula (4).

$$\{[\text{mass (g) of neutralizer/equivalent amount of neutralizer}]/[\text{acid value (KOHmg/g) of polymer} \times \text{mass (g) of polymer}/(56 \times 1,000)]\} \times 100 \quad \text{Formula (4)}$$

In the case where the salt-generating group is a cationic group, the neutralization degree can be determined by the following formula (5).

$$\{[\text{mass (g) of neutralizer/equivalent amount of neutralizer}]/[\text{amine value (HCLmg/g) of polymer} \times \text{mass (g) of polymer}/(36.5 \times 1,000)]\} \times 100 \quad \text{Formula (5)}$$

The acid value and amine value are calculated from the constitutional unit of the polymer. Alternatively, the acid value and amine value can be measured by dissolving the polymer in an appropriate solvent (e.g., MEK), and performing titration. The acid value or amine value of the polymer is preferably 50 to 200, more preferably 50 to 150.

<<Production Method of Dispersion Solution of Resin-Coated Pigment (B)>>

The resin-coated pigment (B) is preferably particles (pigment-containing resin particles) in each of which the resin-coated pigment (B) is included in a resin in the dispersion solution of the resin-coated pigment, and the resin-coated pigment (B) is preferably obtained as an aqueous dispersion solution by a method including the following processes (1) and (2).

Process (1): dispersing a mixture containing a resin, an organic solvent, the resin-coated pigment (B), and water Process (2): removing the organic solvent, to attain an aqueous dispersion liquid containing the resin-coated pigment (B)

In the process (1), a preferable embodiment is a method in which at first, the resin is dissolved in the organic solvent, and then, the resin-coated pigment (B), water, and optionally a neutralizer, a surfactant, etc. are added to the resulting solution, to thereby obtain a W/O dispersion solution. In the mixture, an amount of the resin-coated pigment (B) is preferably 5% by mass to 50% by mass, more preferably 10% by mass to 40% by mass; an amount of the organic solvent is preferably 10% by mass to 70% by mass, more preferably 10% by mass to 50% by mass; an amount of the resin is preferably 2% by mass to 40% by mass, more preferably 3% by mass to 20% by mass; and an amount of the water is preferably 10% by mass to 70% by mass, more preferably 20% by mass to 70% by mass.

In the case where the resin contains a salt-generating group, it is preferred that a neutralizer is used. When the resin is neutralized with a neutralizer, the neutralization degree is not particularly restricted. Typically, the resulting aqueous dispersion liquid is preferably neutral, e.g. pH of 4.5 to 10. The value of pH can be determined depending on the desirable neutralization degree of the resin. Examples of the neutralizer are those listed above. Moreover, a water-insoluble graft polymer may be neutralized in advance.

Examples of the organic solvent include: alcohol solvents such as ethanol, isopropanol, and isobutanol; ketone solvents such as acetone, MEK, MIBK, and diethyl ketone; ether solvents such as dibutyl ether, tetrahydrofuran, and dioxane. A dissolved amount of the organic solvent to 100 g of water is preferably 5 g or larger at 20° C., more preferably 10 g or larger, and more specifically, preferably 5 g to 80 g, more preferably 10 g to 50 g. MEK, and MIBK are particularly preferable.

A dispersion method of the mixture in the process (1) is appropriately selected depending on the intended purpose without any restriction. It is possible that the resin particles are atomized to achieve the desirable average particle diameter just by one dispersing operation, but it is preferred that after performing pre-dispersing, a dispersing operation be further performed with an additional shear stress to thereby control the average particle diameter of the resin particles to the desirable range. The dispersing in the process (1) is preferably performed at 5° C. to 50° C., more preferably 10° C. to 35° C.

At the time of the pre-dispersing, a commonly used mixing-stirring device, such as an anchor blade can be used. Among the mixing-stirring devices, high-speed stirring and mixing devices, such as ULTRA DISPERSER (product name, manufactured by Asada Iron Works. Co., Ltd.), Ebara Milder (product name, manufactured by Ebara Corporation), and TK homomixer (product name, manufactured by PRIMIX Corporation) are preferable.

Examples of a device for applying shear stress during the dispersing operation include: a kneader such as roll mill, bead mill, a kneader, and an extruder; a homovalve-type high pressure homogenizer, such as a high pressure homogenizer (product name, manufactured by Izumi Food Machinery Co., Ltd.), and MINI-LAB 8.3H (product name, Rannie); and a chamber-type high pressure homogenizer such as Microfluidizer (product name, manufactured by Microfluidics), and NANOMIZER (product name, manufactured by NANOMIZER Inc.). These devices may be used in combination. In the case where the pigment is used, among them, the high pressure homogenizer is preferable for attaining the pigment of small diameters.

In the process (2), an aqueous dispersion solution of the pigment-containing resin particles can be obtained by removing the organic solvent from the obtained dispersion solution by a conventional method. It is preferred that the organic solvent in the obtained aqueous dispersion solution containing the resin particles be substantially removed, but it may be remained in the aqueous dispersion solution, provided that it does not impair the object of the present invention. An amount of the residual organic solvent is preferably 0.1% by mass or smaller, more preferably 0.01% by mass or smaller.

The obtained aqueous dispersion solution of the pigment-containing resin particles is a dispersion solution in which solids of the resin containing the pigment are dispersed in a solvent containing water as a main solvent. The embodiment of the pigment-containing resin particles is not particularly restricted, provided that at least particles are each formed of at least the pigment and the resin. Examples of the embodiment thereof include: particles in each of which the pigment is encapsulated in the resin; particles in each of which the pigment is uniformly dispersed in the resin; and particles in each of which the particles are resin particles and the pigment is exposed from a surface of each resin particle.

—Amount of Colorant—

An amount of the colorant in the recording ink is appropriately selected depending on the intended purpose without any restriction, but it is preferably 0.1% by mass to 50.0% by mass, more preferably 0.1% by mass to 20.0% by mass. Accordingly, an amount of the surfactant-dispersible pigment dispersion solution (A) added is adjusted to satisfy the aforementioned range, but it is preferred that a ratio (A/B) of the pigment contained in the surfactant-dispersible pigment dispersion solution (A) to the pigment contained in the resin-coated pigment dispersion solution (B) satisfy 90/10 to 50/50, because an ink capable of forming prints of high image fastness can be attained while maintaining storage stability and ejection stability.

Moreover, the 50% average particle diameter (D50) of the colorant is appropriately selected depending on the intended purpose without any restriction. When the colorant is mixed within the aforementioned ratio, D50 thereof is preferably 150 nm or smaller, more preferably 100 nm or smaller. The average particle diameter of the surfactant-dispersible pigment dispersion solution (A) and the average particle diameter of the resin-coated pigment dispersion solution (B) are 10 nm to 90 nm, 50 nm to 200 nm, respectively. Here, the 50% average particle diameter of the pigment (the colorant) is the value of D50 measured by dynamic light scattering using Ultratrack UPA manufactured by Nikkiso Co., Ltd. at 23° C. and 55% RH.

<Surfactant>

The surfactant has the structure represented by the following formula (1), and has the HLB value of 12 or higher, preferably 12 to 20, and even more preferably 12 to 16. Since this surfactant has an oxyethylene chain, the surfactant tends to attract water molecules, has a high effect of stabilizing dispersion, does not cause aggregation in mixing the surfactant-dispersible pigment (A) and the resin-coated pigment (B), and can stably disperse both the surfactant-dispersible pigment (A) and the resin-coated pigment (B). In addition, the cation component derived from the surfactant reacts with the resin-coated pigment (B) to immediately cause aggregation as moisture in the ink is evaporated on paper, thereby giving high image density, and preventing mixing of colors (bleeding) at an interface between different colors owing to the quick aggregations.

$$R_1\text{—}O\text{—}(CH_2CH_2O)_m\text{-}A \tag{1}$$

In the formula (1), R1 is a C2-C24 alkyl group, alkenyl group, alkylphenyl group, or alkylallyl group; A is —COOM1, —SO$_3$M2, or —PO(OM3)OM4; and m is an integer of 5 to 40. Moreover, M1, M2, and M4 contained in A are each independently alkali metal, quaternary ammonium, quaternary phosphonium, or alkanolamine, and M3 is a hydrogen atom or $R_2(CH_2CH_2O)n$. $R_2$ contained in M3 is a C1-C4 alkyl group, alkenyl group, alkylphenyl group, or alkylallyl group, and n is an integer of 4 to 20.

The number of carbon atoms in the R1 is preferably 2 to 24, more preferably 9 to 23. When the number thereof is larger than 24, the solubility of the surfactant to the aqueous medium may reduce. When the number thereof is smaller than 2, the adsorption of R1 to the surfactant-dispersible pigment (A) may be weaken, and therefore it is difficult to stably dispersed over a long period of time.

Having oxyethylene chain is an important element for attaining dispersion stability, and the average number (m) of added moles of the oxyethylene chain and the alkyl chain in the compound is 5 to 40. When m is larger than 40, however, the viscosity of the inkjet recording ink becomes excessively high, which may lead to poor ejecting properties of the ink. When m is smaller than 5, it may be difficult to stably disperse the ink over a long period of time.

The ink of the present invention contains the resin-coated dispersible pigment (B), which tends to increase the viscosity of the ink. The average number (m) of added moles of the oxyethylene chain in the surfactant is preferably 5 to 15. When m is 5 or smaller, the molecular weight of the surfactant is too small to be sufficiently adsorbed on a surface of each particle of the surfactant-dispersible pigment (A), giving low effect as a dispersant, thereby lowering the storage stability of the resulting ink. When m is 15 or larger, the molecular weight of the surfactant is large, and the molecule of the surfactant is adsorbed on a plurality of particles of the surfactant-dispersible pigment (A), increasing the viscosity of the ink, thereby lowering the ejection stability of the resulting ink. In order to achieve both the storage stability and the ejection stability, m is preferably 8 to 12.

Specific examples of the compounds represented by the general formula (1) are presented below as free acids.

Compound (1)-1: $C_{10}H_{21}O(CH_2CH_2O)_{12}COOH$
Compound (1)-2: $C_4H_9C_6H_4O(CH_2CH_2O)_{10}COOH$ Compound (1)-3: $C_3H_7C_6H_4O(CH_2CH_2O)_{12}COOH$
Compound (1)-4: $C_{13}H_{27}O(CH_2CH_2O)_6COOH$
Compound (1)-5: $C_9H_{19}C_6H_4O(CH_2CH_2O)_{12}SO_3H$
Compound (1)-6: $CH_3(CH_2)_7CH\!=\!CH(CH_2)_8O(CH_2CH_2O)_8 SO_3H$
Compound (1)-7: $C_{12}H_{25}C_6H_4O(CH_2CH_2O)_8SO_3H$
Compound (1)-8: $CH_3(CH_2)_7CH\!=\!CH(CH_2)_8O(CH_2CH_2O)_8 PO(OH)_2$
Compound (1)-9: $C_{13}H_{27}O(CH_2CH_2O)_{10}PO(OH)_2$
Compound (1)-10: $C_9H_{19}C_6H_4O(CH_2CH_2O)_3PO(CH_2CH_2O)_3H(OH)$ Note that, the compounds are not limited to those presented above. Moreover, these compounds may be used independently, or in combination.

An amount of the surfactant is appropriately selected depending on the intended purpose without any restriction, but it is preferably 0.1 parts by mass to 2 parts by mass, more preferably 0.25 parts by mass to 1 part by mass, relative to 1 part by mass of the surfactant-dispersible pigment (A). Use of the surfactant in the aforementioned amount can provide an ink having high ejection stability and storage stability. When the amount of the surfactant is smaller than 0.1 parts by mass, the resulting ink has insufficient storage stability, causing clogging of a nozzle. When the amount thereof is larger than 2 parts by mass, the viscosity of the ink is too high to perform an inkjet recording with such ink.

As commonly used in the part, the HLB value used in the present specification is the abbreviation of Hydrophile-Lipophile Balance value, and is a value indicating an affinity degree of the surfactant to water and to oil. Typically, as a method for calculating a HLB value, various methods such as a method proposed by Atlas, Griffin's method, Davies' method, and Kawakami's method are known, and a value slightly varies depending on the method used. The HLB value of the anionic surfactant in the present specification is calculated by the Griffin's formula represented below:

HLB value=20×(molecular weight of hydrophilic group portion)/(molecular weight of surfactant)

<Water-Soluble Organic Solvent>

Examples of the water-soluble organic solvent include, not limited to, those listed below: polyhydric alcohols such as ethylene glycol, diethylene glycol, 1,3-butanediol, 3-methyl-1,3-butanediol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ether such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolinone, ε-caprolactam, and γ-butyrolactone; amides such as formamide, N-methylformamide, and N,N-dimethylformamide; amines such as monoethanol amine, diethanol amine, and triethyl amine; sulfone-containing compounds such as dimethyl sulfoxide, sulfolane, and thiodiethanol; and others such as propylene carbonate, and ethylene carbonate. These water-soluble organic solvents may be used independently or in combination.

Among them, 1,3-butanediol, diethylene glycol, triethylene glycol and/or glycerin are preferable because use of any of these prevents ejection failures due to evaporation of moisture.

An amount of the water-soluble organic solvent is preferably 10% by mass to 50% by mass, more preferably 20% by mass to 40% by mass, relative to the total amount of the ink. When the amount of the water-soluble organic solvent is within the range described above, within the inkjet recording device, the ink is prevented from increasing the viscosity thereof due to the evaporation of moisture, and at the time when landed on a recording medium, the ink increases its viscosity due to the moisture evaporation, which prevents bleeding of images, and gives prints of high image quality. When the amount thereof is smaller than 10% by mass, the moisture in the ink is easily evaporated, which may cause blockages with the viscous ink due to evaporation of the ink in an ink supplying system of an inkjet recording device. When the amount thereof is larger than 50% by mass, it may be necessary to degrease the solids content such as the colorant and the resin to achieve desirable viscosity of the ink, which may degrease image density of recorded matter. When the amount thereof is 50% by mass or larger, moreover, the blockage with the viscous ink in the inkjet recording device hardly occurs, but the ink does not easily increase its viscosity as landed on a recording medium, which tends to cause bleeding.

<Resin Emulsion>

The ink of the present invention can contain a resin emulsion for improving the dispersion stability of the colorant, and the resin emulsion is preferably a self-emulsifying urethane resin emulsion.

Specific examples thereof include: SF460, SF460S, SF420, SF110, SF300, and SF361 (urethane-based resin emulsions, all manufactured by Nippon Unicar Company Limited); and W5025, and W5661 (urethane-based resin emulsions, both manufactured by Mitsui Chemicals, Inc.).

An amount of the resin emulsion added is preferably 0.5% by mass to 5% by mass on solid basis. When the amount of the resin emulsion is smaller than 0.5% by mass, the dispersion stability of the colorant may insufficient. When the amount thereof is larger than 5.0% by mass, moreover, the solids content in the ink increases, and as a result, the viscosity of the ink increases, which may make ejection of the ink difficult.

<Ink Recorded Matter>

Ink recorded matter containing a recording medium and an image formed on the recording medium with the inkjet recording ink of the present invention is also within the scope of the present invention.

(Inkjet Recording Device and Inkjet Recording Method)

The inkjet recording device of the present invention contains at least an ink jet unit, and may contain other units, if necessary.

The ink jet unit is a unit configured to apply thermal energy or mechanical energy to the inkjet recording ink of the present invention to jet the inkjet recording ink to form an image for recording.

The inkjet recording method of the present invention is a method containing applying thermal energy or mechanical energy to the inkjet recording ink of the present invention to eject the inkjet recording ink to thereby form an image for recording.

The inkjet recording device and inkjet recording method are more specifically explained with reference to drawings hereinafter, but the present invention is limited to these embodiments.

Figure 1:
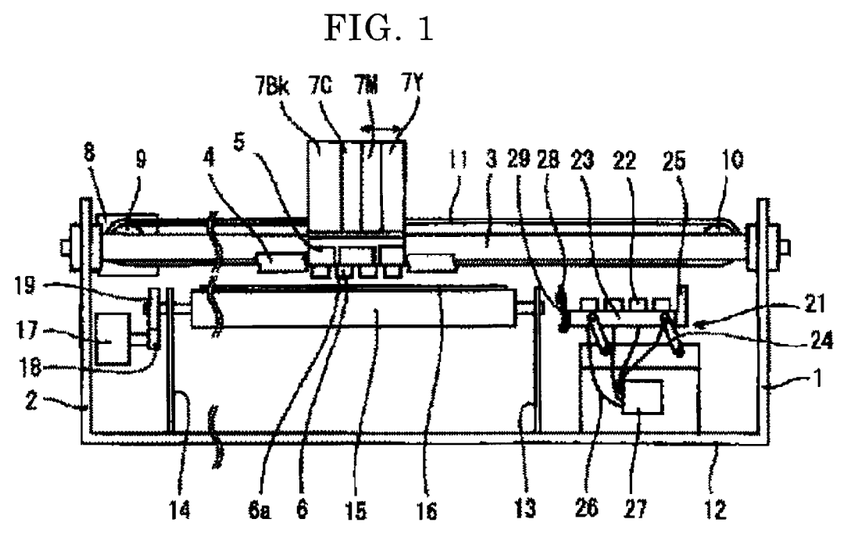
FIG. 1 is a schematic front view illustrating one example of a serial type inkjet recording device equipped with an ink cartridge in which the inkjet recording ink of the present invention is housed.

FIG. 1 is a schematic front view illustrating one example of a mechanical section of a serial type inkjet recording ink equipped mounting an ink cartridge equipped with a recording ink storage housing the inkjet recording ink of the present invention therein. In the mechanical section of the inkjet recording device, a main supporting guide rod 3 and auxiliary supporting guide rod 4 are substantially horizontally placed across the space between both side plates 1 and 2, and a carriage unit 5 is supported by the main supporting guide rod 3 and the auxiliary supporting guide rod 4 in a manner that the carriage unit 5 is freely slidable in the main scanning direction. The carriage unit 5 is equipped with four inkjet heads 6 which ejects a yellow (Y) ink, a magenta (M) ink, a cyan (C) ink, and a black (Bk) ink, respectively, and each of which is provided so that an ejecting face (a nozzle face) 6a faces downwards. Moreover, at the upper side of the heads 6 of the carriage unit 5, four ink cartridges (7Y), (7M), (7C), (7Bk) that are ink suppliers for supplying a respective ink to the four inkjet heads 6 are provided in the manner that they are exchangeable.

Moreover, the carriage unit 5 is configured to travel in the main scanning direction, i.e. moving the four inkjet heads 6 in the main scanning direction, by connecting with a timing belt 11 suspended around a driving pulley (a driving timing pulley) 9 rotated by a main scanning motor 8 and a driven pulley (idle pulley) 10, and controlling the driving by the main scanning motor 8.

Moreover, subframes 13, 14 are provided on a bottom plate 12 connecting the side plates 1, 2 together, and a conveying roller 15 is rotatably supported by the subframes 13, 14 for sending a sheet 16 in a subscanning direction perpendicular to the main scanning direction. A subscanning motor 17 is provided at the side of the subframe 14. For transferring the rotational motions of the subscanning motor 17 to the conveying roller 15, a gear 18 fixed to a rotational axis of the subscanning motor 17 and a gear 19 fixed to an axis of the conveying roller 15 are provided.

Further, a reliability maintaining recovering system (referred to as "sub system" hereinafter) 21 of the head 6 is provided between the side plate 1 and the sub frame 13. The sub system 21 has four capping units 22, which are held on a holder 23, and are configured to cap the ejecting face of each head 6. The holder 23 is held swingably with a linking member 24. As the carriage unit 5 moves in the main scanning direction, and contacts with an engaging part 25 provided in the holder 23, the holder 23 is lifted up along with the movement of the carriage unit 5 to cap the ejecting face 6a of the inkjet head 6 with the capping unit 22. As the carriage unit 5 moves to the side of the printing region, the holder 23 is lifted down along with the movement of the carriage unit 5 to release the capping unit 22 from the ejecting face 6a of the inkjet head 6.

Note that, each capping unit 22 has an air opening to connect to the air via an air releasing tube and an air releasing valve, as well as connecting to a suction pump 27 via a suction tube 26. Moreover, the suction pump 27 discharges the suctioned waste liquid to a waste liquid storage tank (not illustrated) via a drain tube or the like.

Moreover, at the side of the holder 23, a blade arm 29 is swingably supported by the holder 23, and to the blade arm 29a wiper blade 28, which is a wiping unit configured to wipe the ejecting face 6a of the inkjet head 6 and formed of a fibrous member, foam member or elastic member such as rubber, is attached. The blade arm 29 swings with rotations of a cam rotated by a driving unit (not illustrated).

(Ink Cartridge)

The ink cartridge of the present invention contains a container and the inkjet recording ink of the present invention housed in the container.

The ink cartridge will be explained with reference to drawings hereinafter, but the ink cartridge of the present invention is not limited to the embodiment explained below.

Figure 2:
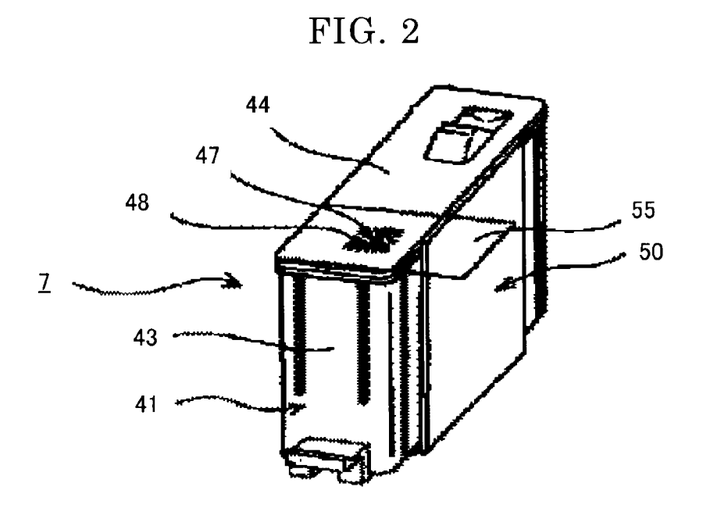
FIG. 2 is an exterior perspective view illustrating one example of an ink cartridge before mounted in a recording device.
Figure 3:
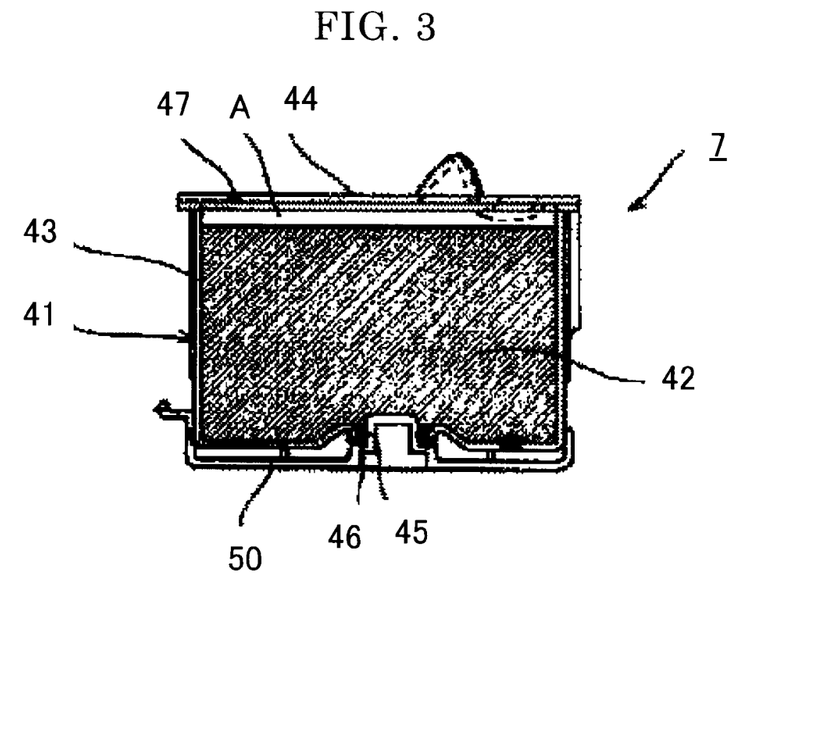
FIG. 3 is a front cross-sectional view illustrating one example of an ink cartridge.

FIG. 2 is an exterior perspective view illustrating one example of an ink cartridge before mounted in a recording device, and FIG. 3 is a front cross-sectional view illustrating one example of an ink cartridge. As illustrated in FIG. 3, the ink cartridge 7 contains an ink absorber 42, which has absorbed an ink of each color, and is housed in a cartridge main body (an ink tank) 41. The cartridge main body 41 is formed by adhering or welding a top led member 44 to a top opening of a case 43 having a wide opening at an upper part thereof, and is formed, for example, of a resin molded product. Moreover, the ink absorber 42 is formed of a porous material such as urethane foam, and is allowed to absorb an ink after compressed and inserted into the cartridge main body 41.

At the bottom of a casing 43 of the cartridge main body 41, an ink feed opening 45 is formed for feeding an ink to the recording head 6, and a sealing ring 46 is engaged with the internal circumferential surface of the ink feed opening 45. Moreover, an air opening 47 is formed in the top lid member 44. To the cartridge main body 41, a cap member 50 is fitted for covering the ink feed opening 45 before mounted in a device, as well as preventing an ink stored inside from leaking during handling such as mounting or transporting, or leaking during vacuum packaging by compression and deformation of the casing 43 with the pressure applied to the wide side walls.

As illustrated in FIG. 2, moreover, the air opening 47 is sealed by adhering a film sealing member 55 having an oxygen transmission rate of 100 ml/m$^2$ or higher to the top lid member 44. The sealing member 55 has a size that is big enough to seal the air opening 47 as well as a plurality of grooves 48 formed surrounding of the air opening 47. By sealing the air opening 47 with the sealing member 55 having the air transmission rate of 100 ml/m$^2$ or higher in the manner as mentioned, and packaging the ink cartridge 7 with a packaging member of no air permeability, such as an aluminum laminate film, even in the case where an air is dissolved in the ink at the time when the ink is filled, or because of the air present in the space A (see FIG. 3) between the ink absorber 42 and the cartridge main body 41, the air in the ink is released via the sealing member 55 to the space between the cartridge main body 41 having a high degree of vacuum and the packaging member, to thereby increase the deaeration degree of the ink.

Figure 4:
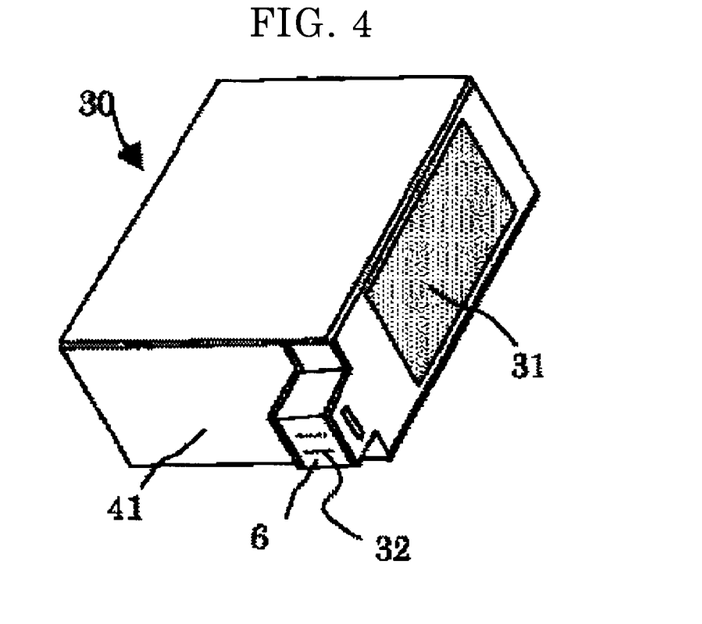
FIG. 4 is an exterior perspective view illustrating one example of an ink cartridge integrated with a recording head.

FIG. 4 depicts one configuration example of an ink cartridge equipped with an ink storage housing the inkjet recording ink of the present invention, and a head for ejecting ink droplets.

Specifically, a recording unit 30 is a serial type, and a main structure thereof consists of an inkjet head 6, an ink tank 41 for storing an ink to be supplied to the inkjet head 6, and a lid member for sealing the ink tank 41. In the inkjet head 6, a plurality of nozzles 32 for ejecting the recording liquid are formed. The ink is sent from the ink tank 41 to a common liquid chamber (not illustrated) via an ink feeding tube (not illustrated), and ejected from the nozzles 32 corresponding to electric signals transmitted from a recording device main body and input by an electrode 31. The recording unit of this type is a structure suitable for a head that is structurally produced at low cost, and a head having a power source driven by thermal energy, so called a thermal type head, or a valve type head. Moreover, the inkjet recording ink of the present invention is not only suitable for a recording method performing ejections of an ink by applying thermal energy, but also suitable for a recording method performing ejections of an ink by applying mechanical energy.

In the present specification, the serial type inkjet recording device is explained, but the inkjet recording ink of the present invention can also be used in a recording device having a so-called line head, in which nozzles are arbitrarily aligned, such as in a cross-woven lattice pattern, to be accumulated into the identical to or about several tens percent of the intended dissolution of an image, and are aligned in the width the same or larger than the width of the recording medium.

Moreover, the recording device mentioned in this specification may be not only a personal computer, or an output printer for a digital camera, but also a device having a composite function combining a facsimile, a scanner, a telephone, and the like.

EXAMPLES

The present invention will be specifically explained through examples hereinafter, but these examples shall not be construed as to limit the scope of the present invention.

| <Preparation of Surfactant-Dispersible Pigment Dispersion Solution> | |
|---|---|
| (1) Black Dispersion Solution A | |
| Carbon black (NIPEX150-IQ, manufactured by DEGUSSA CO., gas black) | 200 parts by mass |
| Surfactant A represented by the following formula (6) (sodium salt of Compound (1)-1, anionic, HLB value > 18) | 50 parts by mass |
| Distilled water | 750 parts by mass |

$C_{10}H_{21}-O-(CH_2CH_2O)_{12}-COONa$ (6)

After pre-mixing aforementioned ingredients, the mixture was dispersed for 15 minutes by means of a bead mill disperser (UAM-015, manufactured by Kotobuki Industries Co., Ltd.) using zirconium beads each having a diameter of 0.03 mm, at the peripheral speed of 10 m/s and the fluid temperature of 30° C. Thereafter, the dispersion was subjected to centrifugal separation by means of a centrifugal separator (Model-3600, manufactured by KUBOTA Corporation) to remove coarse particles, to thereby obtain Black Pigment Dispersion Solution A.

(2) Cyan Dispersion Solution A

Cyan Pigment Dispersion Solution A was obtained in the same manner as in Black Dispersion Solution A above, provided that the carbon black pigment was replaced with Pigment Blue 15:3.

(3) Magenta Dispersion Solution A

Magenta Pigment Dispersion Solution A was obtained in the same manner as in Black Dispersion Solution A above, provided that the carbon black pigment was replaced with Pigment Red 122.

(4) Yellow Dispersion Solution A

Yellow Pigment Dispersion Solution A was obtained in the same manner as in Black Dispersion Solution A above, provided that the carbon black pigment was replaced with Pigment Yellow 74.

(5) Black Dispersion Solution B

Black Pigment Dispersion Solution B was obtained in the same manner as in Black Dispersion Solution A above, provided that the surfactant was replaced with Surfactant B represented by the following formula (7) (an ammonium salt of Compound (1)-5, anionic, HLB value>17).

(6) Cyan Dispersion Solution B

Cyan Pigment Dispersion Solution B was obtained in the same manner as in Black Dispersion Solution B above, provided that the carbon black pigment was replaced with Pigment Blue 15:3.

(7) Magenta Dispersion Solution B

Magenta Pigment Dispersion Solution B was obtained in the same manner as in Black Dispersion Solution B above, provided that the carbon black pigment was replaced with Pigment Red 122.

(8) Yellow Dispersion Solution B

Yellow Pigment Dispersion Solution A was obtained in the same manner as in Black Dispersion Solution A above, provided that the carbon black pigment was replaced with Pigment Yellow 74.

(9) Black Dispersion Solution C

Black Pigment Dispersion Solution C was obtained in the same manner as in Black Dispersion Solution A above, provided that the dispersant was replaced with Surfactant C represented by the following formula (8) (Compound (1)-1, nonionic, HLB value>14).

$C_{10}H_{21}-O-(CH_2CH_2O)_{12}H$ (8)

(10) Cyan Dispersion Solution C

Cyan Pigment Dispersion Solution C was obtained in the same manner as in Black Dispersion Solution C above, provided that the carbon black pigment was replaced with Pigment Blue 15:3.

(11) Magenta Dispersion Solution C

Magenta Pigment Dispersion Solution C was obtained in the same manner as in Black Dispersion Solution C above, provided that the carbon black pigment was replaced with Pigment Red 122.

(12) Yellow Dispersion Solution C

Yellow Pigment Dispersion Solution C was obtained in the same manner as in Black Dispersion Solution C above, provided that the carbon black pigment was replaced with Pigment Yellow 74.

(13) Black Dispersion Solution D

Black Pigment Dispersion Solution D was obtained in the same manner as in Black Dispersion Solution A above, provided that the surfactant was replaced with Surfactant D represented by the following formula (9) (anionic, HLB value<11).

$C_{10}H_{21}-O-(CH_2CH_2O)_3-COONa$ (9)

(14) Cyan Dispersion Solution D

Cyan Pigment Dispersion Solution D was obtained in the same manner as in Black Dispersion Solution D above, provided that the carbon black pigment was replaced with Pigment Blue 15:3.

(15) Magenta Dispersion Solution D

Magenta Pigment Dispersion Solution D was obtained in the same manner as in Black Dispersion Solution D above, provided that the carbon black pigment was replaced with Pigment Red 122.

(16) Yellow Dispersion Solution D
Yellow Pigment Dispersion Solution D was obtained in the same manner as in Black Dispersion Solution D above, provided that the carbon black pigment was replaced with Pigment Yellow 74.
(17) Black Dispersion Solution E
Black Pigment Dispersion Solution E was obtained in the same manner as in Black Dispersion Solution A above, provided that the dispersant was replaced with Surfactant E represented by the following formula (10) (an anionic surfactant having the different structure to that of the formula (1), HLB value of 13).

$$C_{10}H_{21}-COONa \quad (10)$$

(18) Cyan Dispersion Solution E
Cyan Pigment Dispersion Solution E was obtained in the same manner as in Black Dispersion Solution E above, provided that the carbon black pigment was replaced with Pigment Blue 15:3.
(19) Magenta Dispersion Solution E
Magenta Pigment Dispersion Solution E was obtained in the same manner as in Black Dispersion Solution E above, provided that the carbon black pigment was replaced with Pigment Red 122.
(20) Yellow Dispersion Solution E
Yellow Pigment Dispersion Solution E was obtained in the same manner as in Black Dispersion Solution E above, provided that the carbon black pigment was replaced with Pigment Yellow 74.
<Preparation of Resin-Coated Pigment Dispersion Solution>
(21) Black Dispersion Solution F
(Preparation of Polymer Solution)
After sufficiently replacing the inner atmosphere of a 1 L-flask equipped with a mechanical agitator, a thermometer, a nitrogen gas induction tube, a refluxing tube, and a dropping funnel with nitrogen gas, the flask was charged with 11.2 g of styrene, 2.8 g of acrylic acid, 12.0 g of lauryl methacrylate, 4.0 g of polyethylene glycol methacrylate, 4.0 g of styrene macromer (product name: AS-6, manufactured by TOUA-GOUSEI CO., LTD), and 0.4 g of mercapto ethanol, and the resultant was heated to 65° C.
Next, a mixture solution of 100.8 g of styrene, 25.2 g of acrylic acid, 108.0 g of lauryl methacrylate, 36.0 g of polyethylene glycol methacrylate, 60.0 g of hydroxylethyl methacrylate, 36.0 g of styrene macromer (product name: AS-6, manufactured by TOUAGOU CO., LTD), 3.6 g of mercapto ethanol, 2.4 g of azobisdimethyl(valeronitrile) and 18 g of methyl ethyl ketone was added dropwise to the flask over 2.5 hours. After the completion of dripping, 0.8 g of azobisdimethyl(valeronitrile) and 18 g of methyl ethyl ketone were added dropwise to the flask over 0.5 hours. After maturing the mixture at 65° C. for 1 hour, 0.8 g of azobisdimethyl(valeronitrile) was added to the mixture, followed by maturing for another 1 hour. After the completion of the reaction, to the flask, 364 g of methylethyl ketone was added, to thereby yield 800 g of a polymer solution having a concentration of 50%.
(Preparation of Carbon Black Pigment-Containing Resin-Coated Pigment Dispersion Solution)
After sufficiently stirring 28 g of the above-prepared polymer solution, 26 g of a carbon black pigment (Monarch 880, manufactured by Cabot Corporation), 13.6 g of a 1 mol/L potassium hydroxide solution, 20 g of methyl ethyl ketone and 30 g of ion exchange water, the resultant was kneaded by means of a three roll mill. The obtained paste was added to 200 g of ion exchanged water, followed by sufficiently stirred. Thereafter, methyl ethyl ketone and water were evaporated away using an evaporator, followed by removing coarse particles by filtration with a 5 µm-filter (an acetyl cellulose membrane), to thereby obtain Black Pigment Dispersion Solution F.
(22) Cyan Dispersion Solution F
Cyan Pigment Dispersion Solution F was obtained in the same manner as in Black Dispersion Solution F above, provided that the carbon black pigment was replaced with Pigment Blue 15:3.
(23) Magenta Dispersion Solution F
Magenta Pigment Dispersion Solution F was obtained in the same manner as in Black Dispersion Solution F above, provided that the carbon black pigment was replaced with Pigment Red 122.
(24) Yellow Dispersion Solution F
Yellow Pigment Dispersion Solution F was obtained in the same manner as in Black Dispersion Solution F above, provided that the carbon black pigment was replaced with Pigment Yellow 74.
(25) Magenta Dispersion Solution G
Magenta Dispersion Solution G was obtained in the same manner as in Magenta Dispersion Solution A, provided that the amount of Surfactant A was changed from 50 parts by mass to 420 parts by mass.
(26) Yellow Dispersion Solution G
Yellow Dispersion Solution G was obtained in the same manner as in Yellow Dispersion Solution A, provided that the amount of Surfactant A was changed from 50 parts by mass to 15 parts by mass. The 50% average particle diameter (D50) of each of the obtained dispersion solutions A to G was measured by dynamic light scattering at 23° C. and 55% RH by means of Microtrack UPA manufactured by Nikkiso Co., Ltd. The results are presented below.

TABLE 1

| Dispersion solution | D50 (nm) | Dispersion solution | D50 (nm) |
|---|---|---|---|
| Black dispersion solution A | 80 | Black dispersion solution D | 251 |
| Cyan dispersion solution A | 72 | Cyan dispersion solution D | 194 |
| Magenta dispersion solution A | 46 | Magenta dispersion solution D | 157 |
| Yellow dispersion solution A | 20 | Yellow dispersion solution D | 133 |
| Black dispersion solution B | 78 | Black dispersion solution E | 197 |
| Cyan dispersion solution B | 69 | Cyan dispersion solution E | 181 |
| Magenta dispersion solution B | 58 | Magenta dispersion solution E | 110 |
| Yellow dispersion solution B | 33 | Yellow dispersion solution E | 101 |
| Black dispersion solution C | 126 | Black dispersion solution F | 160 |
| Cyan dispersion solution C | 90 | Cyan dispersion solution F | 102 |
| Magenta dispersion solution C | 102 | Magenta dispersion solution F | 125 |
| Yellow dispersion solution C | 79 | Yellow dispersion solution F | 80 |
| | | Magenta dispersion solution G | 40 |
| | | Yellow dispersion solution G | 81 |

Examples 1 to 12, Comparative Example 1 to 20

<Preparation of Ink>

An ink was prepared in accordance with a respective formulation presented in the following Tables 2 to 6. The materials of the formulation were stirred for 1 hour 30 minutes, followed by filtering with a membrane filter having an opening diameter of 0.8 µm, to thereby obtain an ink. Note that, the value for "% by mass" in the column of the dispersion solution depicts the solids content of the dispersion solution. The obtained ink was evaluated in the methods described below. The evaluation results are presented in Tables 2 to 6.

<Evaluation of Storage Stability>

Each ink was filled in an ink cartridge, stored at 65° C. for 3 weeks, and then the viscosities of the ink before and after storing were measured by a R-type viscometer (RE80L, manufactured by Toki Sangyo Co., Ltd.), and the changing rate of the viscosity was calculated from the measured viscosities. The results were evaluated according to the following evaluation criteria. B is acceptable limit.

[Evaluation Criteria]
A: less than 5%
B: 5% or more, but less than 10%
C: 10% or more, but less than 15%
D: 15% or more <Evaluation of Ejection Stability>

The prepared ink was filled in an inkjet printer (IPSiO GX5000, manufactured by Ricoh Company Limited), and the printing operation was performed without capping or cleaning, and then was suspended. After the suspension of the printing operation, the recovery degree of the printer was studied. The results were evaluated based on the suspended time after which the jetting direction changed, or the suspended time after which mass of the ejected droplet changed, in accordance with the following evaluation criteria. B is an acceptable limit.

[Evaluation Criteria]
A: The suspended duration was 600 seconds or longer.
B: The suspended duration was 120 seconds or longer, but shorter than 600 seconds.
C: The suspended duration was 30 seconds or longer, but shorter than 120 seconds.
D: The suspended duration was shorter than 30 seconds.

<Abrasion Resistance>

The prepared ink was filled in an inkjet printer (IPSiO GX5000, manufactured by Ricoh Company Limited), and printing was performed on Type 6200 Paper (of Ricoh Company Limited) at the dissolution of 600 dpi. After drying the resulting print, the printed part was rubbed 10 times with a cotton cloth, a degree of the transferred ink to the cotton cloth was visually observed, and evaluated in accordance with the following evaluation criteria. B is an acceptable limit.

[Evaluation Criteria]
A: No pigment was transferred to the cotton cloth.
B: The pigment was slightly transferred to the cotton cloth.
C: The pigment was clearly transferred to the cotton cloth.
D: The pigment was significantly transferred to the cotton cloth.

<Marker Resistance>

The prepared ink was filled in an inkjet printer (IPSiO GX5000, manufactured by Ricoh Company Limited), and printing was performed on Type 6200 Paper (of Ricoh Company Limited) at the dissolution of 600 dpi. After drying the resulting print, the printed part was marked over with a fluorescent marker pen (PROPUS2, manufactured by Mitsubishi Pencil Co., Ltd.), and the degree of the smear caused by removal of the pigment was visually observed, and evaluated in accordance with the following evaluation criteria. B is an acceptable limit.

[Evaluation Criteria]
A: No smear due to color off was observed.
B: The smear due to color off was slightly observed.
C: The smear due to color off was clearly observed.
D: The smear was significantly spread along with the line made by the marker.

<Image Density>

The prepared ink was loaded on the inkjet printer (IPSiO GX5000, manufactured by Ricoh Company Limited), and a solid image was printed on Type 6200 Paper (of Ricoh Company Limited) by one-pass under the environment of 25° C., and 50% RH. The resulted solid image was measured by X-Rite 938 (X-Rite), and evaluated based on the following evaluation criteria. B is an acceptable limit.

[Evaluation Criteria]
A: image density of 1.0 or higher
B: image density of 0.8 or higher but lower than 1.0
C: image density of 0.6 or higher but lower than 0.8
D: image density of lower than 0.6

<Bleeding at Border of Colors>

The prepared ink was filled in an inkjet printer (IPSiO GX5000, manufactured by Ricoh Company Limited), and printing was performed on Type 6200 Paper (of Ricoh Company Limited) at the dissolution of 600 dpi. After drying the resulting print, an occurrence of bleeding at a boarder of two different colors was visually observed, and evaluated in accordance with the following evaluation criteria. B is an acceptable limit.

[Evaluation Criteria]
A: Vivid image without any bleeding
B: Very slight bleeding in the form of curly lines occurred.
C: Bleeding clearly occurred.
D: Bleeding occurred to the extent that the outlines of characters could not be clearly recognized.

TABLE 2

| Ink formulation | Example | | | | | | | |
|---|---|---|---|---|---|---|---|---|
| (% by weight) | 1 | 2 | 3 | 4 | 5 | 6 | 7 | 8 |
| Black dispersion solution A | 5.0 | — | — | — | — | — | — | — |
| Cyan dispersion solution A | — | 3.0 | — | — | — | — | — | — |
| Magenta dispersion solution A | — | — | 3.0 | — | — | — | — | — |
| Yellow dispersion solution A | — | — | — | 3.0 | — | — | — | — |

TABLE 2-continued

| Ink formulation (% by weight) | Example 1 | 2 | 3 | 4 | 5 | 6 | 7 | 8 |
|---|---|---|---|---|---|---|---|---|
| Black dispersion solution B | — | — | — | — | 6.0 | — | — | — |
| Cyan dispersion solution B | — | — | — | — | — | 4.0 | — | — |
| Magenta dispersion solution B | — | — | — | — | — | — | 4.0 | — |
| Yellow dispersion solution B | — | — | — | — | — | — | — | 4.0 |
| Black dispersion element F | 3.0 | — | — | — | 2.0 | — | — | — |
| Cyan dispersion solution F | — | 3.0 | — | — | — | 2.0 | — | — |
| Magenta dispersion solution F | — | — | 3.0 | — | — | — | 2.0 | — |
| Yellow dispersion solution F | — | — | — | 3.0 | — | — | — | 2.0 |
| Glycerin | 15.0 | 10.0 | 10.0 | 10.0 | 15.0 | 10.0 | 10.0 | 10.0 |
| 1,3-butanediol | 15.0 | 20.0 | 20.0 | 20.0 | — | — | — | — |
| 2,2,4-trimethyl-1,3-pentanediol | — | — | — | — | 15.0 | 20.0 | 20.0 | 20.0 |
| Pure water | Bal. | Bal. | Bal. | Bal. | Bal. | Bal. | Bal. | Bal. |
| Total | 100 | 100 | 100 | 100 | 100 | 100 | 100 | 100 |
| Storage stability | A | A | A | A | A | A | A | A |
| Ejection stability | A | A | A | A | A | A | A | A |
| Abrasion resistance | A | A | A | A | A | A | A | A |
| Marker resistance | A | A | A | A | A | A | A | A |
| Image density | A | A | A | A | A | A | A | A |
| Bleeding at border between colors | A | A | A | A | A | A | A | A |

Note that, "Bal." denotes "Balance" in Table 2.

TABLE 3

| Ink formulation (% by weight) | Example 9 | 10 | 11 | 12 |
|---|---|---|---|---|
| Black dispersion solution A | 7.5 | — | — | — |
| Cyan dispersion solution A | — | 2 | — | — |
| Magenta dispersion solution A | — | — | — | — |
| Yellow dispersion solution A | — | — | — | — |
| Black dispersion solution B | — | — | — | — |
| Cyan dispersion solution B | — | — | — | — |
| Magenta dispersion solution B | — | — | — | — |
| Yellow dispersion solution B | — | — | — | — |
| Black dispersion element F | 0.5 | — | — | — |
| Cyan dispersion solution F | — | 4 | — | — |
| Magenta dispersion solution F | — | — | 3 | — |
| Yellow dispersion solution F | — | — | — | 3 |
| Magenta dispersion solution G | — | — | 3 | — |
| Yellow dispersion solution G | — | — | — | 3 |
| Glycerin | 15 | 10 | 10 | 10 |
| 1,3-butanediol | 15 | 20 | 20 | 20 |
| 2,2,4-trimethyl-1,3-pentanediol | — | — | — | — |
| Pure water | Balance | Balance | Balance | Balance |
| Total | 100 | 100 | 100 | 100 |
| Storage stability | B | A | B | B |
| Ejection stability | A | B | B | B |
| Abrasion resistance | B | A | A | B |
| Marker resistance | B | A | B | B |
| Image density | A | B | B | A |
| Bleeding at border between colors | B | B | B | A |

TABLE 4

| Ink formulation (% by weight) | Comparative Example 1 | 2 | 3 | 4 | 5 | 6 | 7 | 8 |
|---|---|---|---|---|---|---|---|---|
| Black dispersion solution A | 8.0 | — | — | — | — | — | — | — |
| Cyan dispersion solution A | — | 6.0 | — | — | — | — | — | — |
| Magenta dispersion solution B | — | — | 6.0 | — | — | — | — | — |
| Yellow dispersion solution B | — | — | — | 6.0 | — | — | — | — |
| Black dispersion solution F | — | — | — | — | 8.0 | — | — | — |
| Cyan dispersion solution F | — | — | — | — | — | 6.0 | — | — |

TABLE 4-continued

| Ink formulation (% by weight) | Comparative Example | | | | | | | |
|---|---|---|---|---|---|---|---|---|
| | 1 | 2 | 3 | 4 | 5 | 6 | 7 | 8 |
| Magenta dispersion solution F | — | — | — | — | — | — | 6.0 | — |
| Yellow dispersion solution F | — | — | — | — | — | — | — | 6.0 |
| Glycerin | 15.0 | 10.0 | 10.0 | 10.0 | 15.0 | 10.0 | 10.0 | 10.0 |
| 1,3-butanediol | 15.0 | 20.0 | 20.0 | 20.0 | — | — | — | — |
| 2,2,4-trimethyl-1,3-pentanediol | — | — | — | — | 15.0 | 20.0 | 20.0 | 20.0 |
| Pure water | Bal. | Bal. | Bal. | Bal. | Bal. | Bal. | Bal. | Bal. |
| Total | 100 | 100 | 100 | 100 | 100 | 100 | 100 | 100 |
| Storage stability | C | C | C | C | B | B | B | B |
| Ejection stability | B | B | B | B | C | C | C | C |
| Abrasion resistance | D | D | D | D | A | A | A | A |
| Marker resistance | D | D | D | D | A | A | A | A |
| Image density | D | D | D | D | C | C | C | C |
| Bleeding at border between colors | C | C | C | C | C | C | C | C |

Note that, "Bal." denotes "Balance" in Table 4.

TABLE 5

| Ink formulation (% by weight) | Comparative Example | | | | | | | |
|---|---|---|---|---|---|---|---|---|
| | 9 | 10 | 11 | 12 | 13 | 14 | 15 | 16 |
| Black dispersion element C | 4.0 | — | — | — | — | — | — | — |
| Cyan dispersion solution C | — | 3.0 | — | — | — | — | — | — |
| Magenta dispersion solution C | — | — | 3.0 | — | — | — | — | — |
| Yellow dispersion solution C | — | — | — | 3.0 | — | — | — | — |
| Black dispersion element D | — | — | — | — | 3.0 | — | — | — |
| Cyan dispersion solution D | — | — | — | — | — | 2.0 | — | — |
| Magenta dispersion solution D | — | — | — | — | — | — | 2.0 | — |
| Yellow dispersion solution D | — | — | — | — | — | — | — | 2.0 |
| Black dispersion element F | 4.0 | — | — | — | 4.0 | — | — | — |
| Cyan dispersion solution F | — | 3.0 | — | — | — | 3.0 | — | — |
| Magenta dispersion solution F | — | — | 3.0 | — | — | — | 3.0 | — |
| Yellow dispersion solution F | — | — | — | 3.0 | — | — | — | 3.0 |
| Glycerin | — | — | — | — | 10.0 | 10.0 | — | — |
| 1,3-butanediol | 15.0 | 15.0 | 15.0 | 15.0 | 20.0 | 20.0 | 15.0 | 15.0 |
| 2,2,4-trimethyl-1,3-pentanediol | 15.0 | 15.0 | 15.0 | 15.0 | — | — | 15.0 | 15.0 |
| Pure water | Bal. | Bal. | Bal. | Bal. | Bal. | Bal. | Bal. | Bal. |
| Total | 100 | 100 | 100 | 100 | 100 | 100 | 100 | 100 |
| Storage stability | B | B | B | B | D | D | D | D |
| Ejection stability | B | B | B | B | D | D | D | D |
| Abrasion resistance | A | A | A | A | B | B | B | B |
| Marker resistance | A | A | A | A | B | B | B | B |
| Image density | C | C | C | C | A | A | A | A |
| Bleeding at border between colors | C | C | C | C | A | A | A | A |

Note that, "Bal." denotes "Balance" in Table 5.

TABLE 6

| Ink formulation | Comparative Example | | | |
|---|---|---|---|---|
| (% by weight) | 17 | 18 | 19 | 20 |
| Black dispersion element E | 2.0 | — | — | — |
| Cyan dispersion solution E | — | 2.0 | — | — |
| Magenta dispersion solution E | — | — | 2.0 | — |
| Yellow dispersion solution E | — | — | — | 2.0 |
| Black dispersion element F | 5.0 | — | — | — |
| Cyan dispersion solution F | — | 3.0 | — | — |
| Magenta dispersion solution F | — | — | 3.0 | — |
| Yellow dispersion solution F | — | — | — | 3.0 |
| Glycerin 1,3-butanediol | 15.0 | 10.0 | 10.0 | 10.0 |
| 2,2,4-trimethyl-1,3-pentanediol | 15.0 | 20.0 | 20.0 | 20.0 |
| Pure water | Balance | Balance | Balance | Balance |
| Total | 100 | 100 | 100 | 100 |
| Storage stability | D | D | D | D |
| Ejection stability | D | D | D | D |
| Abrasion resistance | B | B | B | B |
| Marker resistance | B | B | B | B |
| Image density | A | A | A | A |
| Bleeding at border between colors | A | A | A | A |

It was found that Examples 1 to 12 had excellent properties in all evaluation items. Comparative Examples 1 to 4 had excellent ejection stability, but had poor storage stability, and had poor image fastness as the ink did not contain the resin-coated pigment dispersion solution. Comparative Examples 5 to 8 had excellent storage stability, but poor ejection stability. Comparative Examples 9 to 12 were inks containing a combination of the surfactant-dispersible pigment dispersion solution dispersed by the nonionic dispersant and the resin-coated pigment dispersion solution, and had excellent ejection stability and storage stability, but did not reach to the level of image density or bleeding achieved by Examples, because the aggregation effect was not exhibited on paper unlike the case where the anionic surfactant was used. Comparative Examples 13 to 16 were inks containing a combination of the surfactant-dispersible pigment dispersion solution dispersed by the anionic surfactant having the similar structure to that of the surfactant for use in the present invention but having low HLB value, and the resin-coated pigment dispersion solution, and the inks had low storage stability and low ejection stability as the dispersibility of the surfactant was low. Comparative Examples 17 to 20 were inks containing a combination of the surfactant-dispersible pigment dispersion solution dispersed by the anionic surfactant having the different structure to that of the surfactant for use in the present invention, and the resin-coated pigment dispersion solution. Similarly to Comparative Examples 13 to 16, the inks of Comparative Examples 17 to 20 had low storage stability and low ejection stability as the dispersibility of the surfactant was not sufficient.

It was found from the results of Examples 1 to 12 that the inkjet recording ink of the present invention had excellent storage stability and ejection stability of the ink, and could form high quality images having high image density and image fastness, without causing bleeding at a border between different colors.

The embodiments of the present invention are as follows:

<1> An inkjet recording ink, containing:
water:
a water-soluble organic solvent;
a colorant; and
a surfactant,
wherein the colorant contains a surfactant-dispersible pigment (A) which is dispersed by the surfactant, and a resin-coated pigment (B), and
wherein the surfactant is a surfactant having an HLB value of 12 or higher, selected from the group consisting of anionic surfactants represented by the following formula (1):

$$R_1-O-(CH_2CH_2O)_m-A \quad (1)$$

where R1 is a C2-C24 alkyl group, alkenyl group, alkylphenyl group, or alkylallyl group; A is $-COOM1$, $-SO_3M2$, or $-PO(OM3)OM4$, where M1, M2 and M4 are each independently alkali metal, quaternary ammonium, quaternary phosphonium, or alkanolamine, and M3 is a hydrogen atom or $R_2(CH_2CH_2O)n$ with proviso that $R_2$ is a C1-C4 alkyl group, alkenyl group, alkylphenyl group, or alkylallyl group, and n is an integer of 4 to 20; and m is and integer of 15 to 40.

<2> The inkjet recording ink according to <1>, wherein a solid mass ratio (A/B) of the surfactant-dispersible pigment (A) to the resin-coated pigment (B) in the inkjet recording ink is 90/10 to 50/50.

<3> The inkjet recording ink according to <1> or <2>, wherein the surfactant is contained in an amount of 0.1 parts by mass to 2 parts by mass relative to 1 part by mass of the surfactant-dispersible pigment (A).

<4> An ink cartridge, containing:
a container; and
the inkjet recording ink as defined in any one of <1> to <3> and housed in the container.

<5> An inkjet recording device containing:
an ink jet unit configured to apply thermal energy or mechanical energy to the inkjet recording ink as defined in any one of <1> to <3> to eject the inkjet recording ink to thereby form an image for recording, <6> An inkjet recording method, containing:
applying thermal energy or mechanical energy to the inkjet recording ink as defined in any one of <1> to <3> to eject the inkjet recording ink to form an image for recording.

<7> Ink recorded matter, containing:
a recording medium; and
an image formed on the recording medium with the inkjet recording ink as defined in any one of <1> to <3>.

This application claims priority to Japanese patent application No. 2011-013687, filed on Jan. 26, 2011, and incorporated herein by reference.

What is claimed is:
1. An inkjet recording ink, comprising:
water;
a water-soluble organic solvent;
a colorant; and
a surfactant,
wherein the colorant contains a surfactant-dispersible pigment (A) which is dispersed by the surfactant, and a resin-coated pigment (B), and
wherein the surfactant is a surfactant having an HLB value of 12 or higher, selected from the group consisting of anionic surfactants represented by the following formula (1):

$$R_1-O-(CH_2CH_2O)_m-A \quad (1)$$

where R1 is a C2-C24 alkyl group, alkenyl group, alkylphenyl group, or alkylallyl group; A is $-COOM1$, —SO₃M2, or —PO(OM3)OM4, where M1 and M4 are each independently alkali metal, quaternary ammonium, quaternary phosphonium, or alkanolamine, M2 is alkali metal, quaternary phosphonium, or alkanolamine, and M3 is a hydrogen atom or R₂(CH₂CH₂O)n with proviso that R₂ is a C1-C4 alkyl group, alkenyl group, alkylphenyl group, or alkylallyl group, and n is an integer of 4 to 20; and m is and integer of 15 to 40.

2. The inkjet recording ink according to claim 1, wherein a solid mass ratio (A/B) of the surfactant-dispersible pigment (A) to the resin-coated pigment (B) in the inkjet recording ink is 90/10 to 50/50.

3. The inkjet recording ink according to claim 1, wherein the surfactant is contained in an amount of 0.1 parts by mass to 2 parts by mass relative to 1 part by mass of the surfactant-dispersible pigment (A).

4. The inkjet recording ink according to claim 1, wherein the surfactant has an HLB value of 12 to 20.

5. The inkjet recording ink according to claim 1, wherein A is —COOM1.

6. The inkjet recording ink according to claim 1, wherein A is —SO₃M2.

7. The inkjet recording ink according to claim 1, wherein A is —PO(OM3)OM4.

8. An ink cartridge, comprising:
a container; and
an inkjet recording ink housed in the container,
wherein the inkjet recording ink contains:
water;
a water-soluble organic solvent;
a colorant; and
a surfactant,
wherein the colorant contains a surfactant-dispersible pigment (A) which is dispersed by the surfactant, and a resin-coated pigment (B), and
wherein the surfactant is a surfactant having an HLB value of 12 or higher, selected from the group consisting of anionic surfactants represented by the following formula (1):

$$R_1—O—(CH_2CH_2O)_m-A \quad (1)$$

where R1 is a C2-C24 alkyl group, alkenyl group, alkylphenyl group, or alkylallyl group; A is —COOM1, —SO₃M2, or —PO(OM3)OM4, where M1, and M4 are each independently alkali metal, quaternary ammonium, quaternary phosphonium, or alkanolamine, M2 is alkali metal, quaternary phosphonium, or alkanolamine, and M3 is a hydrogen atom or R₂(CH₂CH₂O)n with proviso that R₂ is a C1-C4 alkyl group, alkenyl group, alkylphenyl group, or alkylallyl group, and n is an integer of 4 to 20; and m is and integer of 15 to 40.

9. The ink cartridge according to claim 8, wherein the surfactant has an HLB value of 12 to 20.

10. The ink cartridge according to claim 8, wherein A is —COOM1.

11. The ink cartridge according to claim 8, wherein A is —SO₃M2.

12. The ink cartridge according to claim 8, wherein A is —PO(OM3)OM4.

13. An inkjet recording method, comprising:
applying thermal energy or mechanical energy to an inkjet recording ink to eject the inkjet recording ink to form an image for recording,
wherein the inkjet recording ink contains:
water;
a water-soluble organic solvent;
a colorant; and
a surfactant,
wherein the colorant contains a surfactant-dispersible pigment (A) which is dispersed by the surfactant, and a resin-coated pigment (B), and
wherein the surfactant is a surfactant having an HLB value of 12 or higher, selected from the group consisting of anionic surfactants represented by the following formula (1):

$$R_1—O—(CH_2CH_2O)_m-A \quad (1)$$

where R1 is a C2-C24 alkyl group, alkenyl group, alkylphenyl group, or alkylallyl group; A is —COOM1, —SO₃M2, or —PO(OM3)OM4, where M1, and M4 are each independently alkali metal, quaternary ammonium, quaternary phosphonium, or alkanolamine, M2 is alkali metal, quaternary phosphonium, or alkanolamine, and M3 is a hydrogen atom or R₂(CH₂CH₂O)n with proviso that R₂ is a C1-C4 alkyl group, alkenyl group, alkylphenyl group, or alkylallyl group, and n is an integer of 4 to 20; and m is and integer of 15 to 40.

14. The inkjet recording method according to claim 13, wherein the surfactant has an HLB value of 12 to 20.

15. The inkjet recording method according to claim 13, wherein A is —COOM1.

16. The inkjet recording method according to claim 13, wherein A is —SO₃M2.

17. The inkjet recording method according to claim 13, wherein A is —PO(OM3)OM4.

* * * * *